United States Patent

[11] 3,593,228

| [72] | Inventor | Yoshio Miyauchi |
| | | Hikone, Japan |
| [21] | Appl. No. | 776,620 |
| [22] | Filed | Nov. 18, 1968 |
| [45] | Patented | July 13, 1971 |
| [73] | Assignee | Dainippon Screen Mfg., Ltd. |
| | | Kyoto, Japan |
| [32] | Priority | Nov. 18, 1967 |
| [33] | | Japan |
| [31] | | 42/74,060 |

[54] DEVICE FOR SELECTING AND OPERATING CONTACT SCREENS IN A PHOTOMECHANICAL (PROCESS) CAMERA
4 Claims, 5 Drawing Figs.

[52] U.S. Cl. .................................................. 355/18, 355/73, 355/74
[51] Int. Cl. .................................................. G03b 27/00
[50] Field of Search ................................... 355/18, 71, 73, 74, 125, 126; 352/45, 42

[56] References Cited
UNITED STATES PATENTS
2,939,371  6/1960  Schutt .......................... 355/73 X
FOREIGN PATENTS
222,386  7/1962  Australia ...................... 355/71
1,155,308  4/1958  France ......................... 355/18

Primary Examiner—Samuel S. Matthews
Assistant Examiner—Monroe H. Hayes
Attorney—Spensley, Horn & Lubitz ABSTRACT: Device for Selecting and Positioning Contact Screens in a Photomechanical (Process) Camera wherein the screens are received in the upper section of the rear case of the camera and selectively positioned along an axis vertically displaced from the optical axis.

YOSHIO MIYAUCHI INVENTOR

BY Spensley & Horn

YOSHIO MIYAUCHI INVENTOR

BY Spensley & Horn

DEVICE FOR SELECTING AND OPERATING CONTACT SCREENS IN A PHOTOMECHANICAL (PROCESS) CAMERA

DETAILED DESCRIPTION OF THE INVENTION

Figure 1:
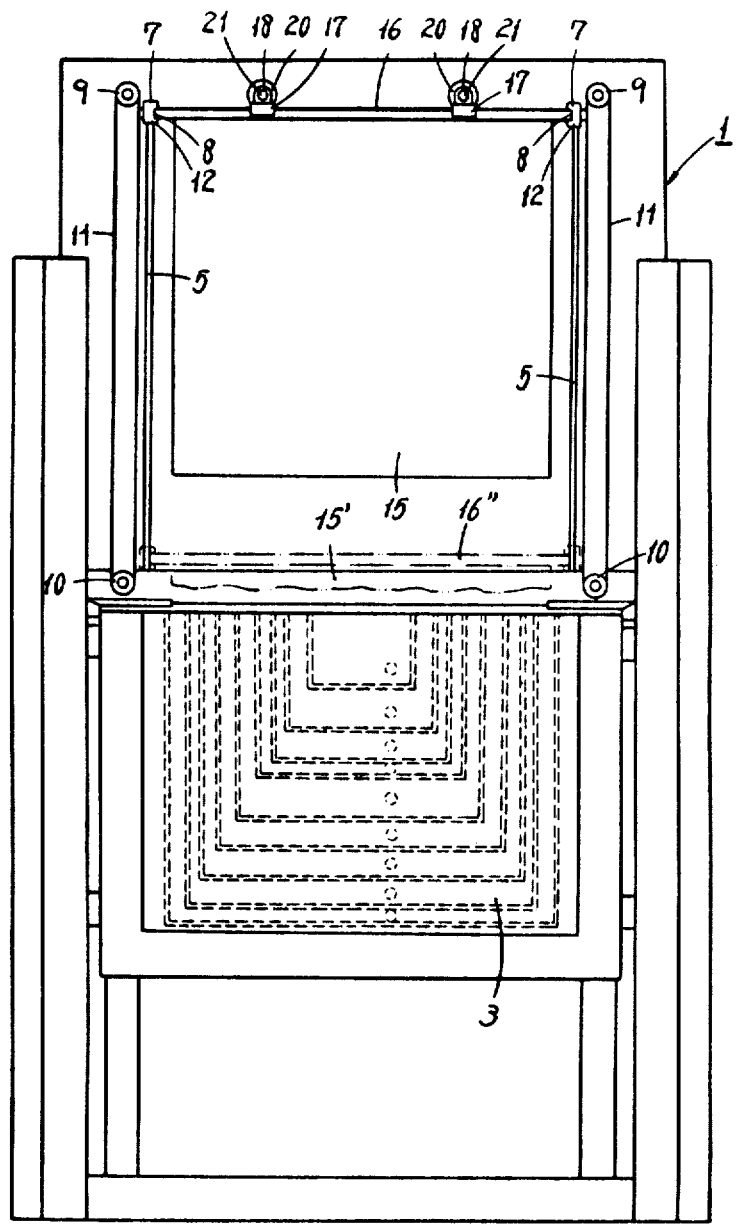
FIG. 1 is the general front view.

This invention embodies a device for selecting any desired one of contact screens of different rulings, angles, etc. which are suspended laterally in rows in the upper half section of the rear case of a process camera and lowering said selected contact screen on to the surface of the vacuum film holder which is installed vertically in the lower half section of the rear case for use. An embodiment of this device is minutely explained in accordance with the attached drawings as follows:

The vacuum back 3 is installed in a vertical position within the lower half section of the rear case 1 with its vacuum contact surface 2 facing the lens assembly of the process camera.

At each side end within the upper half section of the rear case 1 is a frame unit consisting of a rear support 4 and a fore support 5 which are so arranged that a slot 6 between the two supports 4 and 5 defines an aligned position which is slightly to the fore and above the contact surface 2 of the vacuum back 3 towards the lens assembly.

Two U-shaped pieces 7-7, one at the top of each frame unit and in the respective slots 6-6 between the rear and the fore supports 4-4 and 5-5 respectively are provided with the open part 8 of the U-shaped pieces 7-7 facing each other. On the outer side of the respective slots at the top and bottom of the support units on both sides are respective pairs of sprockets 9 and 10, each of which are connected with an endless chain 11 to which the back side of the respective U-shaped pieces 7-7 is secured so that when the chain 11 is driven by the sprockets 9 and 10, the attached U-shaped pieces 7-7 move up and down inside and along their respective slots 6-6.

The cut-away surfaces 13 and 14 of the upper sections of the rear support 4 and the fore support 5 respectively are so arranged that their surfaces are level with the top surface of the lower jaw 12 of the U-shaped piece 7 when the piece 7 is brought to its uppermost position. The continuous surface which is thus made by 13 and the top surface of the lower jaw 12 and 14, supports a number of bars 16 to which contact screens 15 of different rulings, angles, etc. are secured and suspended.

Figure 3:
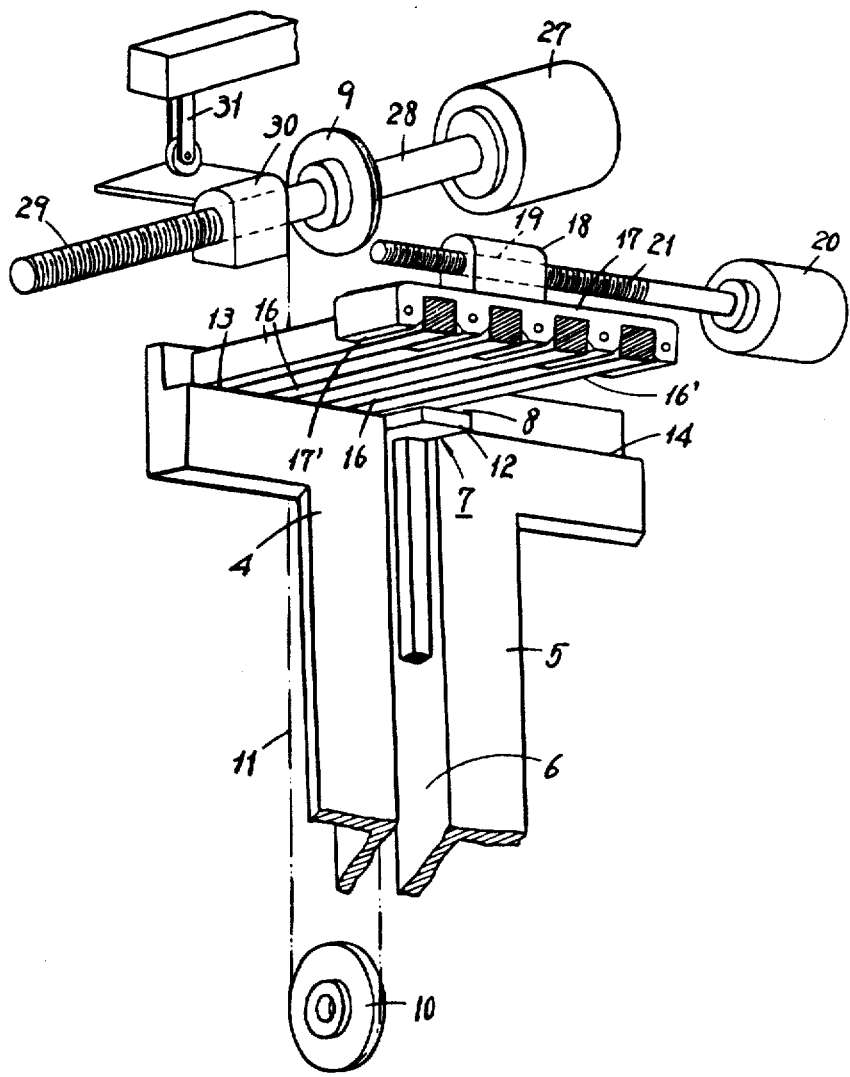
FIG. 3 the perspective view of the forward/backward and up/down movement devices of the frame for suspending the contact screens.
Figure 4:
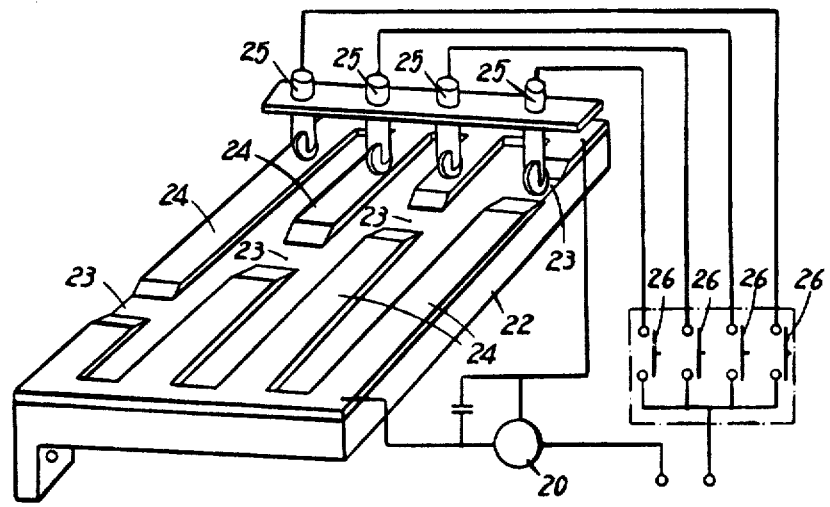
FIG. 4 the perspective view showing the device for stopping the forward/backward movement of the contact screens.
Figure 5:
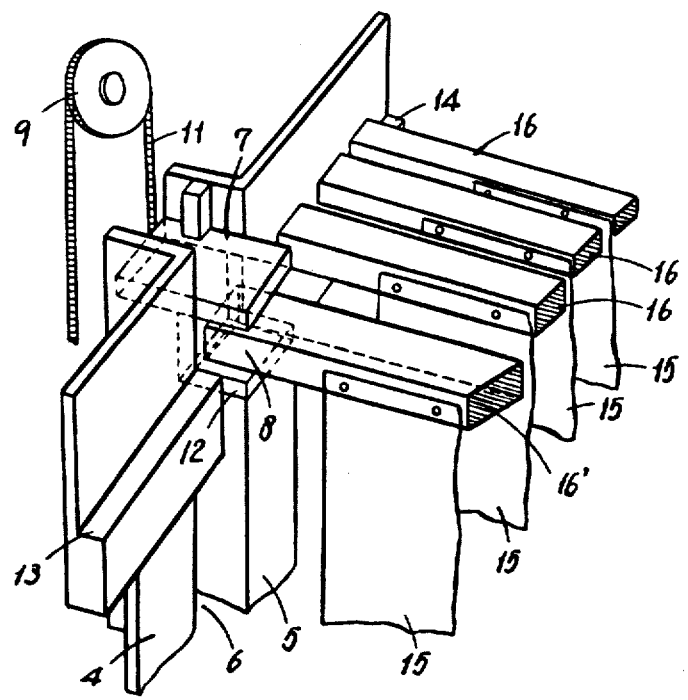
FIG. 5 the perspective view of the up/down movement device of the contact screens.

The bars 16 are held in place at even distances by the respective jaws 17' of the brace 17 as shown in FIG. 3. In FIG. 3 a guide piece 18 is secured to the top surface of the brace 17 and is tapped to provide an internal screw 19 for the drivescrew 21 which is driven by a reversible electric motor 20 so that it moves the brace 17 by which the bars 16 are held in the forward and backward lengthwise directions of the camera depending on the revolution of the motor 20, thereby enabling contact screens 15 attached to the bars 16 to move forward and backward.

A terminal frame 22, the length of which is about the same as the length of the brace 17, is secured to one side of the brace 17, and the motor 20 is wired in parallel with the rear and fore ends of the frame 22. The frame 22 is provided with a number of pieces 24 identical in number as that of the bars 16. These pieces 24 run the full length of the frame 22 but with a gap 23 with bevelled edges in each, the position of which corresponds with the position of each bar 16.

Rotatable contacts or brushes 25, the position of which are positioned and spaced with respect to the slots 6–6 and the number of which corresponds to the number of conductive pieces 24, are provided above the frame 22. These brushes 25 are wired respectively to their pushbutton switches 26 and contact the surface of each piece 24. When any one of the switches 26 is pressed, the electric motor 20 will turn and the bars 16 held by the brace 17 to which is secured the frame 22 will move forward or backward. When the brush 25 of the selected switch 26 comes to the nonconductive gap 23 of the corresponding piece 24, the circuit of the motor 20 is broken and the bar 16' below this gap is in a position on the surface of the lower jaw 12 of the U-shaped piece 7.

The U-shaped piece 7 which supports the bar 16' and which is in the slot 6 between the rear and the fore supports 4 and 5 will commence to slide down the slot 6 when the sprocket 9 to which it is attached begins to turn as a motor 27 commences to turn. This sprocket 9 is attached to a shaft 28 of the motor 27 and the end part 29 of this shaft is threaded. In FIG. 3 this threaded end 29 passes through a guide 30 having a portion which contacts a stationary brush or switch 31 that controls motor 27. When the sprocket 9 turns for a certain number of times, the U-shaped piece 7 will reach the bottom end of the slot 6 and at the same time the guide 30 will move along the threaded end 29 of the shaft 28 for a specific distance and will disconnect the stationary brush 31 thereby stopping the motor 27.

Figure 2:
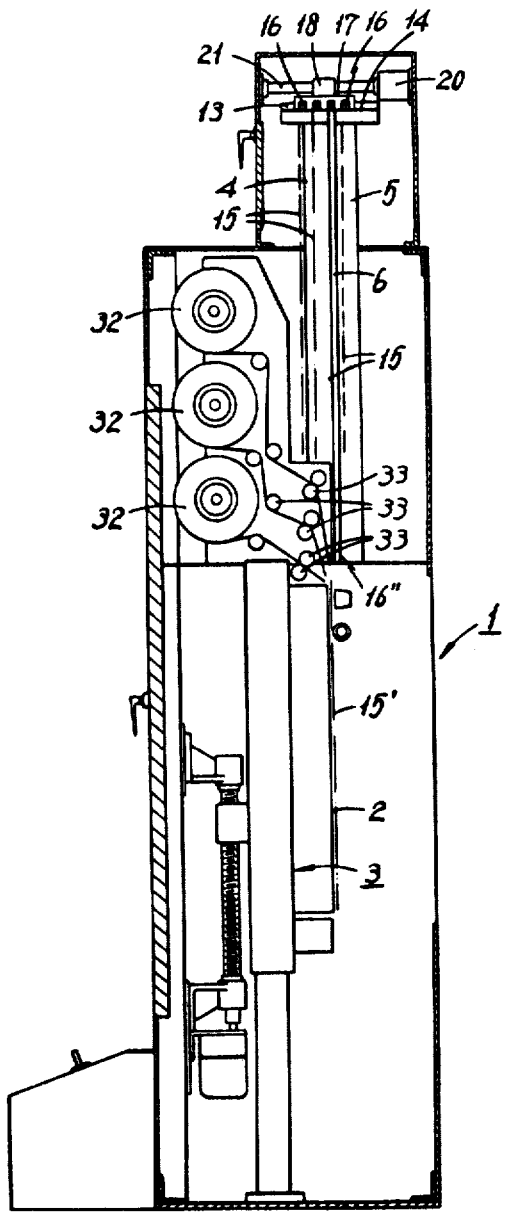
FIG. 2 the general section drawing of the side view.

In FIG. 2, the figures 32 indicate roll films housed in the upper rear section of the rear case 1. The films are fed by a guide roller unit 33 to the vacuum contact surface 2 of the vacuum back 3 where they are vacuum contacted thereto. The roll film mechanism and structure is discussed in more detail in U.S. Pat. application Ser. No. 777,274 by the same inventor and assigned to the assignee of this application.

The construction of this invention is as stated, by which the desired contact screen 15' is lowered in front of the film by pressing the corresponding button switch 26 to start the motor 20 for this operation. The film 32 is already in contact with the vacuum back 3. When the motor 20 turns, the brace 17 will move the bars 16 from which the contact screens 15 are suspended along the continuous surface made by 13 and 14 of both the rear and fore supports 4 and 5 and the top surface of the lower jaw 12. When the selected bar 16' moves to a position on top of the surface of the lower jaw 12 of the U-shaped piece 7, the corresponding stationary brush 25 wired to the corresponding switch 26 which is pressed will coincide with the gap 23 of the corresponding piece 24 thereby cutting off the circuit of the motor 20.

At this instance, the motor 27 for the sprocket 9 turns in the direction to lower the U-shaped piece 7 preferably through the medium of an automatic relay circuit enabled by the brush 25 coinciding with gap 23. This lets the selected bar 16', the ends of which are supported by the U-shaped pieces 7-7 at each side slide down the slot 6 between the supports 4 and 5 on both sides.

When the U-shaped piece 7 reaches the bottom end of the slot 6, the guide 30 which is moved by the threaded end 29 of the motor shaft 28 during the time the U-shaped piece 7 is being lowered, moves past the stationary brush 31 and thereby stops the motor 27.

As the slot 6 is in its position at this instance slightly ahead of the vacuum contact surface 2 of the vacuum back 3 towards the lens assembly, the contact screen 15' which is brought down by the lowering of the bar 16' along the slot 6 will be positioned slightly in front of the film on the vacuum contact surface 2. The screen 15' is then vacuum contacted to the surface 2 and when the picture is exposed, the image will be projected onto the film on the vacuum contact surface 2 after passing through the contact screen 15' in front by which the desired result is obtained.

To raise the bar 16" which is at the lowest position of the slot 6, the revolution of the electric motor 27 is reversed.

The subject invention, as explained automatically selects the desired contact screen from those which are provided parallel in the upper section of the rear case and sets it in position in front of the film in the lower section of the rear case to be exposed, greatly improving the facilities for operation. The arrangement of the screens above the optical axis of the camera with movement parallel to the optical axis decidedly simplifies the structure required to provide selection of screens and automatic dispensing thereof.

I claim:

1. A device for selecting and positioning contact screens used in combination with a process camera, a forward and backward moving assembly having a plurality of screens suspended in parallel therefrom, a first drive means for moving said assembly with respect to the film holder of said camera, and a second drive means for moving the selected screen up and down in a vertical slot thereby enabling the selected screen to be lowered into an aligned position in front of said film holder, wherein the device comprises:
  1. a frame disposed upon said moving assembly having a plurality of first electrically conducting means whose longitudinal axes are parallel to the direction of motion of said assembly, where each of said first conducting means has a nonconducting gap disposed along said longitudinal axis;
  2. a plurality of second electrically conducting means in juxtaposition with said frame, each of said second conducting means being in contact with one of said first conducting means along its longitudinal axis;
  3. a plurality of switching means, each one of which is associated with the selection of one of said screens, where one terminal of each of said switching means is connected to one side of said first drive means and a second terminal of which is electrically connected to one of said second conducting means, whereby the selection of one of said switching means energizes said first drive means through the electrical contact made between said second conducting means and said first conducting means in juxtaposition with said second conducting means, thereby causing said first drive means to move said assembly and said frame until said second conducting means comes into contact with said nonconducting gap, thereby breaking the electrical contact and causing the assembly to stop at a position which enables said desired screen associated with said selected switching means to be moved up and down in said vertical slot by said second drive means.

2. The device of claim 1 wherein said first electrically conducting means are metallic surfaces; and said second electrically conducting means are brushes.

3. The device of claim 1 wherein said first electrically conducting means are metallic surfaces; and said second electrically conducting means are rotatable contacts.

4. The device of claim 1 wherein said nonconducting gap is an airgap.